May 15, 1923.  1,454,893

M. JACKSON

SAW SHARPENING AND SETTING DEVICE

Filed May 16, 1921  3 Sheets-Sheet 1

Maurice Jackson
INVENTOR

BY

ATTORNEY

May 15, 1923.
M. JACKSON
1,454,893
SAW SHARPENING AND SETTING DEVICE
Filed May 16, 1921
3 Sheets-Sheet 2
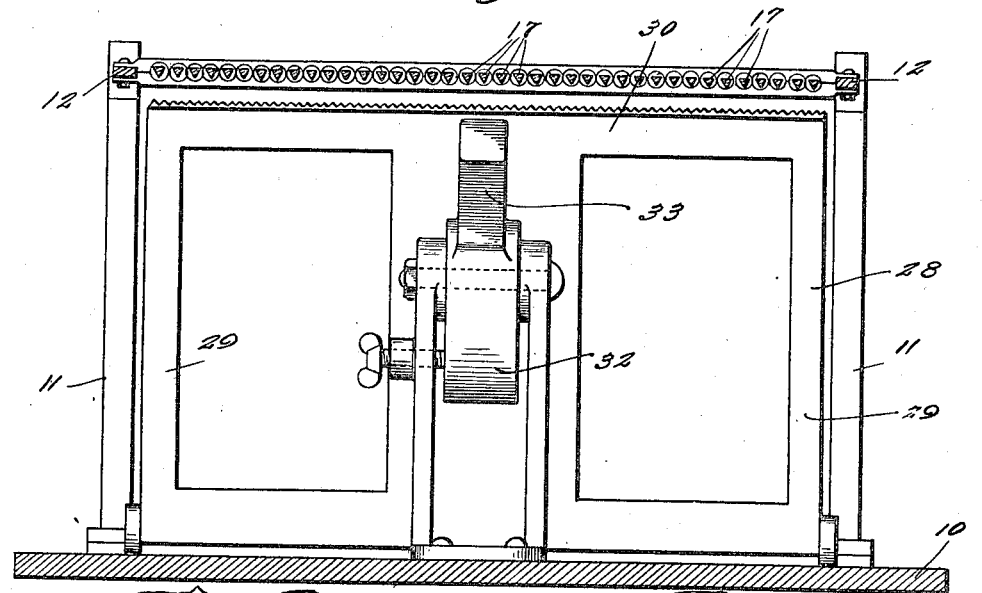
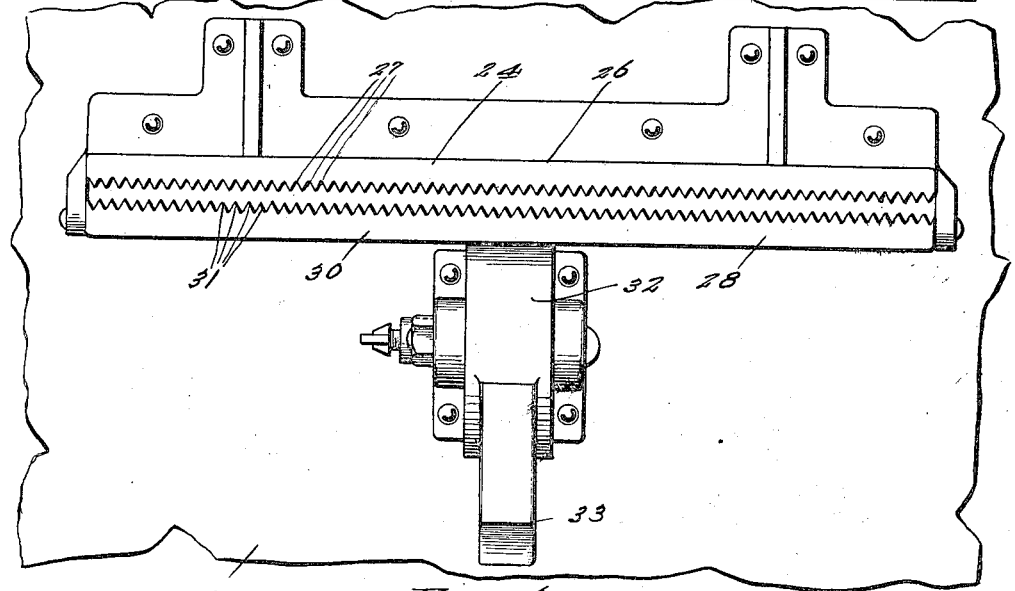
Maurice Jackson INVENTOR
BY *Victor J. Evans*
ATTORNEY
R. G. Thomas
WITNESSES May 15, 1923.
M. JACKSON
1,454,893
SAW SHARPENING AND SETTING DEVICE
Filed May 16, 1921
3 Sheets-Sheet 3
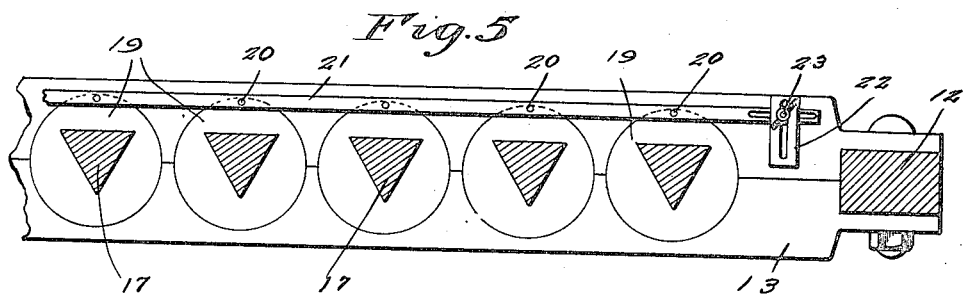
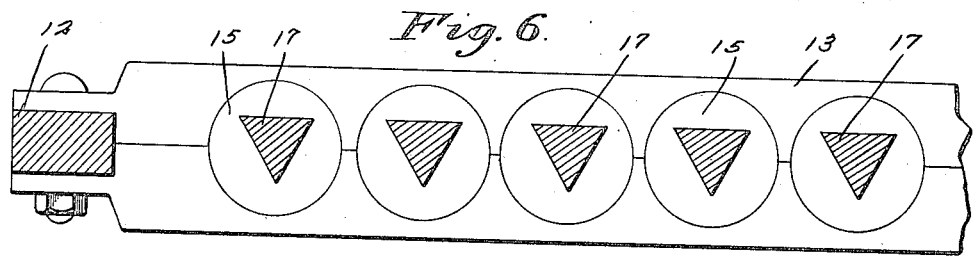
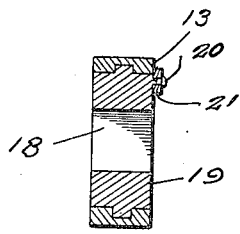
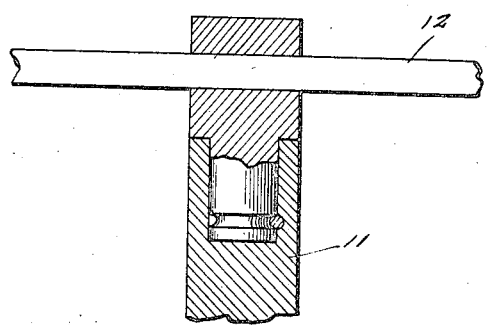
Maurice Jackson
INVENTOR Patented May 15, 1923.

1,454,893

UNITED STATES PATENT OFFICE.

MAURICE JACKSON, OF ELDORADO, KANSAS.

SAW SHARPENING AND SETTING DEVICE.

Application filed May 16, 1921. Serial No. 469,895.

*To all whom it may concern:*

Be it known that I, MAURICE JACKSON, a citizen of the United States, residing at Eldorado, in the county of Butler and State of Kansas, have invented new and useful Improvements in Saw Sharpening and Setting Devices, of which the following is a specification.

This invention relates to devices for sharpening and setting saws, and has for its object the provision of a novel device by means of which a saw of any ordinary type, such as a hand saw or the like, may be very quickly and easily sharpened and also set so that the teeth thereof will be disposed at the proper angle.

An important and most specific object is the provision of a machine of this character which may be operated either manually or by means of power and which is so constructed that a great many of the teeth may be sharpened and set at the same time, the device being consequently a great time and labor saver.

Another object is the provision of a machine of this character which will not only sharpen and set the teeth of a saw in a very short time but which will treat them so that they will be far more accurate and in better condition than can be obtained by any of the ordinary or well-known methods.

An additional object is the provision of a device of this character in which are provided a plurality of files which are capable of being simultaneously reciprocated for sharpening the teeth, these files being moreover adjustable simultaneously so that they may be caused to lie at different angles for sharpening the saw teeth at different angles.

A further object is the provision of a machine of this character which will be simple and inexpensive in manufacture, highly efficient in use, durable in service, positive in action and a general improvement in the art.

With the above and other objects and advantages in view, the invention consists in the details of construction to be hereinafter more fully described and claimed and illustrated in the accompanying drawings, in which:

Figure 3 is a longitudinal sectional view,

Figure 1:
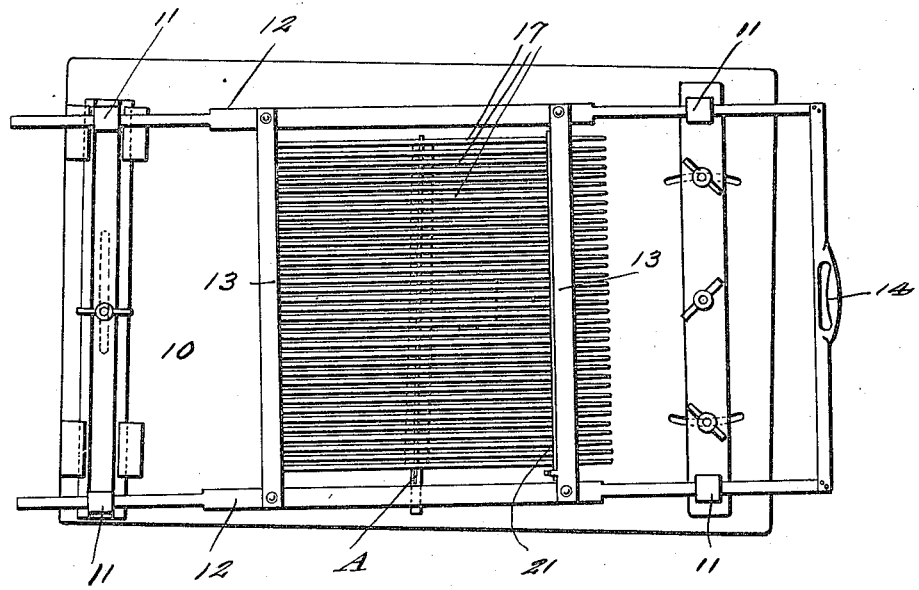
Figure 1 is a plan view of the device.
Figure 2:
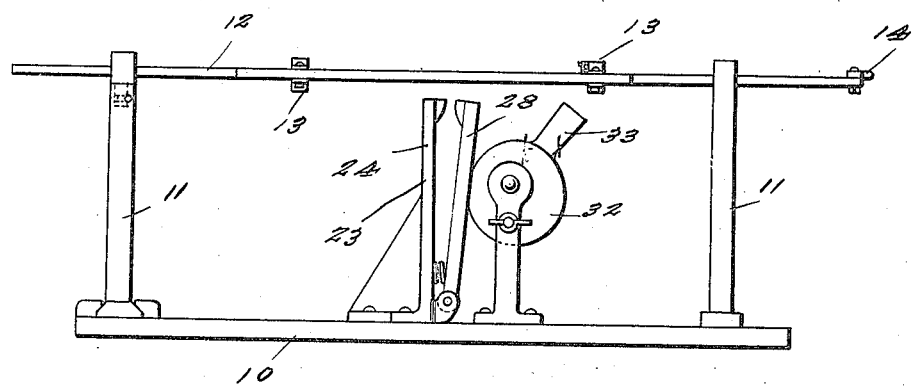
Figure 2 is a side elevation thereof.

Figure 4 is a cross sectional view showing an end elevation of the setting means, Figure 5 is a plan view of the setting means alone, Figure 6 is a cross sectional view showing an end elevation of the file holders at one end of the device, Figure 7 is a similar view showing an elevation of the means for holding the other ends of the files, and Figure 8 is a detail sectional view showing the mounting of the movable rods.

Referring more particularly to the drawings, the numeral 10 designates the base of the device and 11 designates a plurality of spaced uprights which are arranged in pairs and which extend upwardly from the end portions of the base. Slidable through the pairs of uprights are longitudinally movable rods 12 which are arranged in spaced parallel relation and which are connected intermediate their ends by pairs of cross bars 13. The numeral 14 designates a suitable handle associated with one of the rods 12 whereby to impart reciprocatory motion thereto and consequently to both rods. Journaled between two of the cross bars 13 is a series of disks 15 provided with triangular holes for receiving one end of a plurality of triangular files 17 which are disposed in spaced parallel relation. The other ends of the files are engaged within triangular holes 18 formed in disks 19 journaled between the other pair of cross bars 13. Projecting from the disks 19 are eccentric pins 20 with which is connected a link 21 which may be moved in one direction or the other for the purpose of partially rotating the disks and consequently changing the angular inclination of the files. This link 21 moves through a guide 22 which is provided with a set screw 23 or the like for the purpose of holding the latter in adjusted position.

Disposed below the files and the supporting means therefor is a saw holder comprising a stationary member 24 including uprights connected by a cross member 26 which has one face formed with a plurality of teeth 27. Associated with this stationary member 24 is a movable member 28 similar in construction and including pivoted uprights 29 connected by a cross member 30 which has its face toward the cross member 26 formed with a plurality of teeth 31 adapted to interfit with the teeth 27. A suitable cam member 32 is associated with and engages the movable member 28 so that this movable member may be forced toward the stationary member 24 and this cam 32 is actuated by means of a suitable pivoted lever 33 mounted upon the base 10.

The operation of the device is as follows: The saw A to be sharpened is placed between the stationary member 24 and the movable member 28 after which the lever 33 is operated so that the cam 32 will force the pivoted member 28 into clamping engagement with the stationary member 24 whereby to hold the saw rigid. It is of course understood that the saw is placed between the two devices with its teeth uppermost. The link 21 is moved so that the files 17 will have the proper angular adjustment to accord with the pitch of the teeth desired and the operator then moves the handle 14 so as to reciprocate the rods 12 which carry the cross bars 13 which form a carriage for the files. The reciprocatory movement of the rods 12 is continued until the files have sharpened or cut the teeth to the desired sharpness and size. In actual practice it is probable that the files 17 will be placed a distance apart equal to twice the distance between the successive saw teeth so that the files will operate to sharpen every other tooth of the saw. After the alternate teeth have been sharpened as above described, it is of course a simple matter for the operator to release the movable member 28 from its clamping relation to the stationary member 24 and shift the saw longitudinally so that the other alternate teeth thereof will be sharpened by the reciprocatory movement of the files. After the saw has been thus sharpened, it is intended that the cam 32 be released so that the movable member 28 will be moved out of clamping engagement with the member 24, whereupon the saw is moved downwardly between the two members until the saw teeth register with the teeth 27 and 31 whereupon the operator then moves the lever 33 to bring the cam 32 into engagement with the movable member 28 for forcing the movable member or the stationary member 24 and owing to the fact that the teeth 27 and 31 are in staggered relation or in interfitting relation it will be quite apparent that the teeth will engage the teeth of the saw and bend the teeth of the saw in opposite directions so that they will be properly set.

From the foregoing description and a study of the drawings it will be apparent that I have thus provided a simply constructed and consequently inexpensive device for very rapidly sharpening and setting saw teeth in an expeditious and effective manner free from great labor and at a considerable saving of time and energy.

While I have shown and described the preferred embodiment of the invention, it is of course to be understood that I reserve the right to make such changes in the form, construction and arrangement of parts as will not depart from the spirit of the invention or the scope of the subjoined claims.

Having thus described the invention what is claimed:

1. A saw sharpening machine comprising a base, a plurality of uprights rising from said base, a pair of rods slidable through the uprights, cross members connected with said rods, a plurality of files, means connected with said cross members for holding said files, a clamping device disposed between said uprights and beneath said files and adapted to hold a saw to be sharpened, and means for simultaneously adjusting all of the files.

2. A device of the character described comprising a base, a plurality of uprights rising therefrom and arranged in pairs, a pair of rods slidable through said uprights and arranged in spaced parallel relation, cross members carried by said rods, a plurality of disks journaled in said cross members and formed with holes, files disposed between said cross members and having their ends engaged within the holes in said disks, a link connected with all of the disks in one cross member whereby to effect rotary adjustment of all the files simultaneously, means for holding said links in adjusted positions, and a clamping device disposed beneath said files and adapted to hold a saw to be sharpened.

3. A device of the character described comprising a base, a plurality of uprights rising therefrom, a pair of rods slidable through said uprights and arranged in spaced parallel relation, cross members carried by said rods, a plurality of files having their ends carried by the cross members, means for reciprocating said rods and consequently the files, and a clamping device carried by the base and disposed beneath the files, said clamping device including a stationary member, a pivoted member associated with the stationary member, and cam operated means for forcing said movable member into clamping relation with the stationary member, the confronting faces of the stationary member and the pivoted member being formed with teeth arranged in staggered relation and adapted to engage alternate teeth of a saw whereby to effect setting thereof.

4. In a device of the character described, a frame, saw clamping means, a movable frame member, and means on said movable frame for holding a plurality of files consisting of bars formed with mating recesses and disks located within said recesses and clamped by the bars, said disks being formed with triangular openings for the reception of the files.

In testimony whereof I affix my signature.

MAURICE JACKSON.